US012367792B2

(12) United States Patent
Carey et al.

(10) Patent No.: US 12,367,792 B2
(45) Date of Patent: Jul. 22, 2025

(54) LABEL RETAINING DEVICE

(71) Applicants: Benjamin George Carey, Randburg (ZA); Stephen John Piper, Benoni (ZA)

(72) Inventors: Benjamin George Carey, Randburg (ZA); Stephen John Piper, Benoni (ZA)

( * ) Notice: Subject to any disclaimer, the term of this patent is extended or adjusted under 35 U.S.C. 154(b) by 323 days.

(21) Appl. No.: 17/907,154

(22) PCT Filed: Mar. 23, 2021

(86) PCT No.: PCT/ZA2021/050019
§ 371 (c)(1),
(2) Date: Sep. 23, 2022

(87) PCT Pub. No.: WO2021/195674
PCT Pub. Date: Sep. 30, 2021

(65) Prior Publication Data

US 2023/0335018 A1 Oct. 19, 2023

(30) Foreign Application Priority Data

Mar. 23, 2020 (ZA) ................................ 2020/01796
Jun. 5, 2020 (ZA) ................................ 2020/03363
Oct. 5, 2020 (ZA) ................................ 2020/06141

(51) Int. Cl.
*G09F 3/06* (2006.01)
*G09F 3/16* (2006.01)
*G09F 3/00* (2006.01)

(52) U.S. Cl.
CPC .............. *G09F 3/16* (2013.01); *G09F 3/0297* (2013.01)

(58) Field of Classification Search
CPC ................................ G09F 3/16; G09F 3/0297
See application file for complete search history.

(56) References Cited

U.S. PATENT DOCUMENTS 1,814,436 A * 7/1931 Saussure, Jr. ............. G09F 3/16 40/666
2,882,627 A * 4/1959 Gilbert ...................... G09F 3/14 40/663
3,530,605 A * 9/1970 Gutterson ................. G09F 1/10 40/658

(Continued)

FOREIGN PATENT DOCUMENTS

GB 565750 A 11/1944

OTHER PUBLICATIONS

Pavdi Dominika (Authoized Officer), International Search Report dated Jan. 12, 2022, International Application No. PCT/ZA2021/050019, 2 pages.

*Primary Examiner* — Gary C Hoge
(74) *Attorney, Agent, or Firm* — MH2 Technology Law Group, LLP

(57) ABSTRACT

A system for serving legal documents for initiating legal proceedings which includes a repository, the form of a database which is stored on a server (not shown), for receiving and storing legal documents for initiating legal proceedings, a notification means, in the form of a notifier, for notifying a recipient via an agreed digital address (not shown) of receipt by the database of a legal document, and a payment means (not shown) for allowing the recipient to access the legal document free of charge.

8 Claims, 15 Drawing Sheets

(56) References Cited

U.S. PATENT DOCUMENTS

| | | | | |
|---|---|---|---|---|
| 3,744,104 | A * | 7/1973 | Ford | G09F 3/005 24/561 |
| 3,955,296 | A * | 5/1976 | Kapstad | G09F 3/16 40/658 |
| 4,713,899 | A | 12/1987 | Fast | |
| 5,289,652 | A | 3/1994 | Kringel et al. | |
| 5,577,395 | A * | 11/1996 | Kuykendall | G09F 3/005 63/3 |
| 10,176,732 | B1 | 1/2019 | Hinkens | |
| 11,464,322 | B1 * | 10/2022 | Nguyen | A45F 5/1558 |
| 2007/0113452 | A1 * | 5/2007 | Pollack | G09F 1/10 40/658 |
| 2016/0284249 | A1 * | 9/2016 | Daly | G09F 3/0335 |

* cited by examiner

LABEL RETAINING DEVICE

CROSS-REFERENCE TO RELATED APPLICATIONS

This application is a U.S. National Stage application of PCT/ZA2021/050019, filed Mar. 23, 2021, and claims priority to South African Patent Application No. 2020/01796, which was filed on Mar. 23, 2020, South African Patent Application No. 2020/03363, which was filed on Jun. 5, 2020, and South African Patent Application No. 2020/06141, which was filed Oct. 5, 2020. Each of these priority applications is incorporated herein by reference in their entirety.

TECHNICAL FIELD

This invention relates to a label retaining device.

SUMMARY OF THE INVENTION

According to the invention, there is provided a label retaining device including: —

- a base;
- a mounting arrangement for mounting the base on an article to be labelled;
- a receiving member arranged on the base which defines a receiving zone for receiving a label complementally thereon via an aperture defined in the label for such purpose; and
- a retaining member for facilitating retention of the label in the receiving zone.

The base may be in the form of a substantially planar member having any suitable geometric shape of the group including but not limited to circular, ovular square, rectangular, and triangular. Preferably, the base may be substantially rectangular or square. The base may be shaped to sit substantially flush with an outer surface of the article to be labelled, typically being a crate and/or any conventional container, so as to hinder removal of the base from the article. The base may define an aperture which is sized and/or shaped to receive any suitable conventional mounting arrangement therethrough to mount the base on the article. The base may include a support member extending therefrom to allow the base to be supported on a surface. The support member may be formed integrally the base.

A cover may be provided for covering a portion of the base so as to define an enclosed receiving zone and to further facilitate retention of the label in the receiving zone. The cover may be in the form of a substantially planar member having any suitable geometric shape of the group including but not limited to circular, ovular square, rectangular, and triangular, preferably being substantially rectangular or square so as to correspond substantially with the shape of the base. The cover may be formed integrally the base.

A connector may be provided for allowing releasable, preferably hinged, interconnection between the cover and the base.

The mounting arrangement may include an extension portion which extends from the base and is configured and/or shaped to be received, preferably in an interference fit manner, by complementally registering apertures in the article. The mounting arrangement may further include an anchoring portion which is shaped and/or configured to anchor the extension portion within the apertures in the article. A locating member may further be provided which may extend outwards the base for locating the base on the article and to inhibit pivoting of the base about the mounting arrangement relative the article. The locating member may be in the form of a protrusion which is shaped to fit within an aperture defined by the article. Alternatively, the mounting arrangement may be in the form of any suitable conventional mounting arrangement which may be selected from the group including a rivet, push-clip, screw, tie, cable tie, adhesive, magnet, and clip.

The receiving member and retaining member may be spaced from each other and extend inwardly from the base and the cover so as to define a, preferably substantially tortuous, pathway in an overlapping region between the receiving and retaining members, preferably peripheral regions of the members overlap, wherein the members allow the label to pass through the overlapping region and into a receiving condition wherein the receiving member receives the label complementally thereon, and the retaining member serves to inhibit the passing of the label out of the overlapping region in the receiving condition. The receiving and retaining members may taper away from the overlapping region towards a label receiving inlet. Alternatively, the receiving and retaining members may be in the form of a formation which extends inwardly from either the base or cover towards an opposing surface of the base or cover, a free end region of the formation having a dimension so as to define a passage which permits passing of the label therethrough and into a receiving condition, wherein the member receives the label complementally thereon via an aperture defined in the label for such purpose and inhibits passing of the label out of the passage in the receiving condition.

In another form of the invention, a plurality of receiving members may be arranged on the base which define a plurality of receiving zones for receiving a label or labels complementally thereon via a plurality of apertures defined in the label or labels for such purpose.

A plurality of retaining members may be provided for facilitating retention of the label or labels in the plurality of receiving zones.

A unique identifier may be provided to identify and track each article on which the base is mounted. The identifier may be in the form of any suitable conventional identifier.

The label retaining device as hereinbefore described may be manufactured from any suitable synthetic, plastic and/or metallic material.

According to a second aspect of the invention, there is provided a label which includes:—

- a body;
- a neck portion defined by the body which is shaped to be received complementally by a label retaining device as hereinbefore described;
- an aperture defined in the neck portion; and
- a frangible portion arranged between a peripheral region of the neck portion and the aperture to facilitate frangible removal of the label from the label retaining device.

Alternatively, the neck portion may define a plurality of apertures.

A mounting means may be provided for allowing the neck portion to be mounted on the body. The mounting means may be in the form of any suitable conventional adhesive, preferably being glue.

A unique identifying means may be provided on a lower portion of the body to identify and provide information about an article associated therewith. The unique identifying means may be in the form of any suitable conventional barcode, QR code, microdot or the like.

A plurality of neck portions may be defined by the body which are shaped to be received complementally by a plurality of label retaining devices as hereinbefore described.

The body may be in the form of any one or more of the group including a pamphlet, leaflet, brochure, and advertising page.

The neck portions may be arranged in a spaced apart manner relative the body for allowing a mass or weight of the body to be evenly supported by corresponding label retaining devices in which the neck portions may be received. Typically, the neck portions may be arranged towards opposing side regions of the body. It is to be appreciated that further neck portions may be arranged along an edge of the bodies which are larger and require additional support.

Alternatively, the neck portions may define a plurality of apertures.

According to a third aspect of the invention, there is provided a label retaining assembly which includes:— a label retaining device as hereinbefore described; and a container wherein the label retaining device forms part of the container.

The container may be in the form of any suitable conventional container and/or crate.

BRIEF DESCRIPTION OF THE DRAWINGS

A label retaining device in accordance with the invention will now be described by way of the following, non-limiting examples with reference to the accompanying drawings.

In the drawings:—

DETAILED DESCRIPTION OF THE INVENTION

Figure 1B:
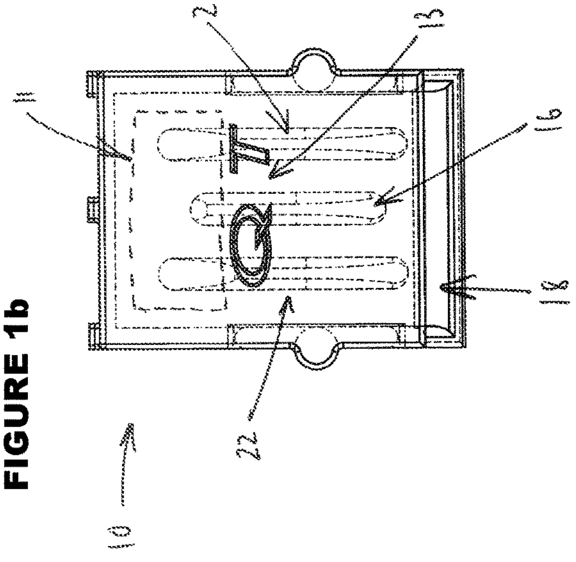
FIG. 1*b* is a plan view of the label retaining device shown in FIG. 1*a;*
Figure 1C:
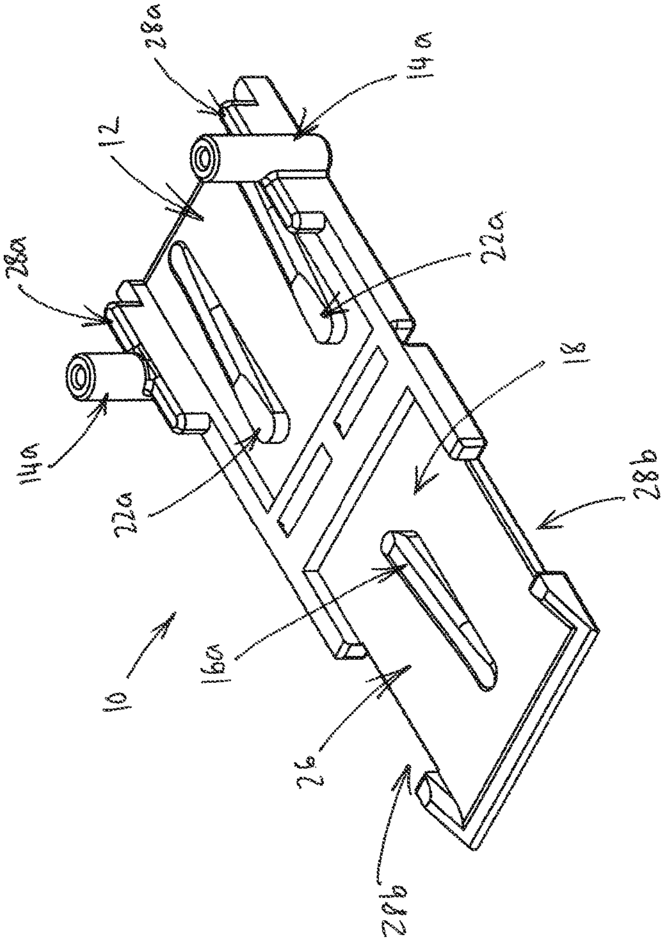
FIG. 1*c* is a perspective view of the label retaining device shown in FIG. 1*a* wherein the cover is positioned alongside the base.
Figure 1A:
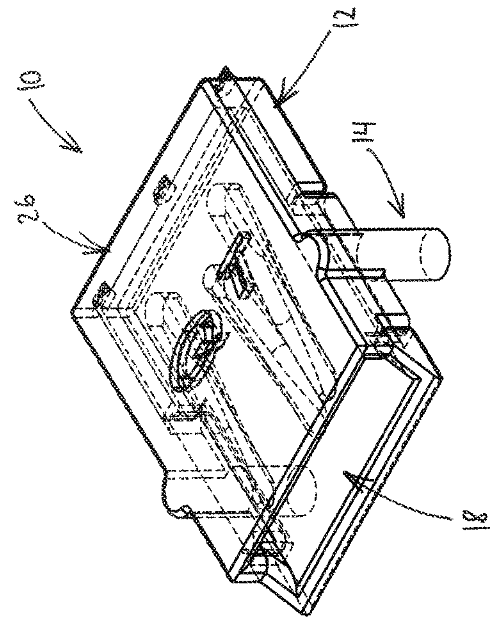
FIG. 1*a* is a perspective view of the label retaining device with the cover mounted on the base.
Figure 2C:
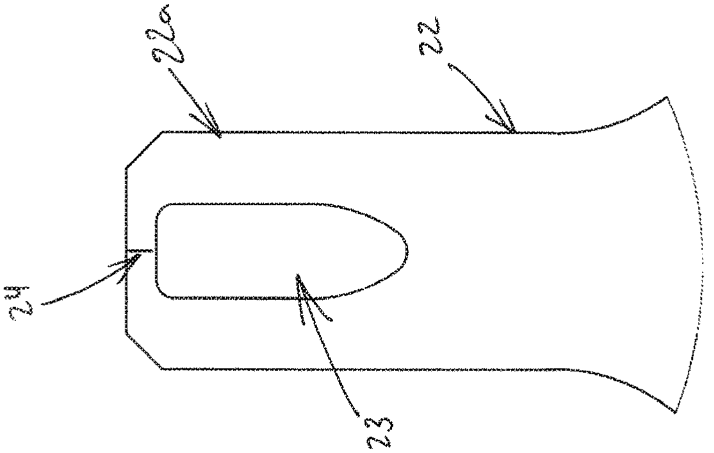
FIG. 2*c* is an enlarged view of the neck portion of the label shown in FIG. 2*b;*
Figure 2B:
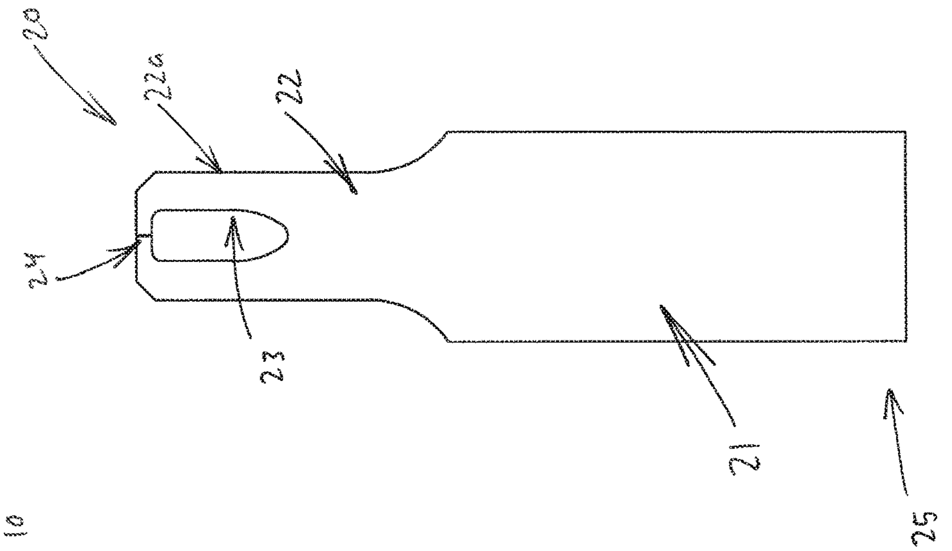
FIG. 2*b* is a plan view of the label shown in FIG. 2*a;*

In a first embodiment of the invention, shown in FIGS. 1 and 2, reference numeral 10 refers generally to a label retaining device including a base 12, a mounting arrangement 14 for mounting the base 12 on an article to be labelled (not shown), a receiving member 16 arranged on the base 12 which defines a receiving zone 18 for receiving a label 20 complementally thereon via an aperture 23 defined in the label 20 for such purpose, and a retaining member 22 for facilitating retention of the label 20 in the receiving zone 18.

The base 12 is in the form of a substantially planar member having any suitable geometric shape of the group including but not limited to circular, ovular square, rectangular, and triangular. Typically, the base 12 is substantially rectangular or square. The base 12 is shaped to sit substantially flush with an outer surface of the article to be labelled, typically being a crate or conventional container (not shown), so as to hinder removal of the base 12 from the crate or container (not shown).

A cover 26 is provided for covering a portion of the base 12 so as to define an enclosed receiving zone 18 and to further facilitate retention of the label 20 in the receiving zone 18. The cover 26 is in the form of a substantially planar member having any suitable geometric shape of the group including but not limited to circular, ovular square, rectangular, and triangular, typically being substantially rectangular or square so as to correspond substantially with the shape of the base 12. The cover 26 may be formed integrally the base 12.

A connector 28 is provided for allowing releasable interconnection between the cover 26 and the base 12. The connector is in the form of complementally engaging formations 28*a*, 28*b* defined by a peripheral region of the base 12 and cover 26, respectively, to allow the cover 26 to be connected to the base 12.

The mounting arrangement 14 includes an extension portion 14*a* which extends from the base 12 and is configured and shaped to be received, typically in an interference fit manner, by complementally registering apertures (not shown) in the article (not shown).

Figure 2A:
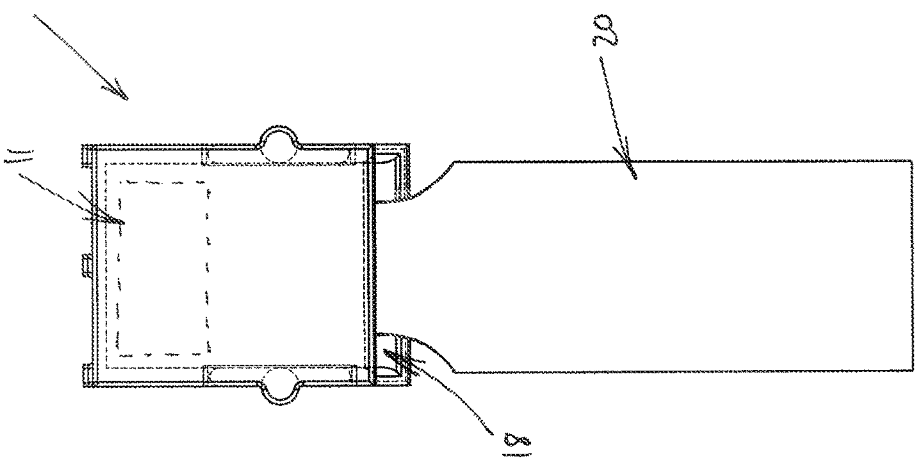
FIG. 2*a* is a plan view of the label retaining device shown in FIG. 1*a* retaining a label.
Figure 7D:
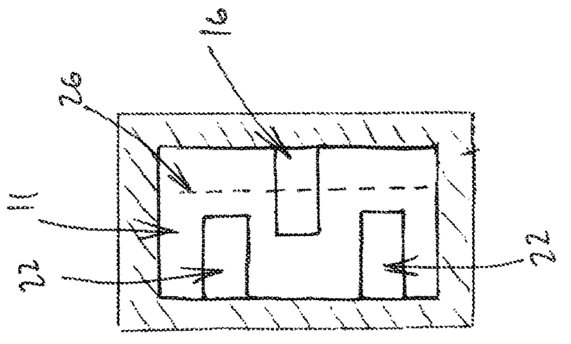
FIG. 7*a* to 7*d* are hand-drawings of various cross-sections taken through the label retaining device shown in FIG. 1*a* depicting the path followed by the label as it is received by the label receiving device.
Figure 7C:
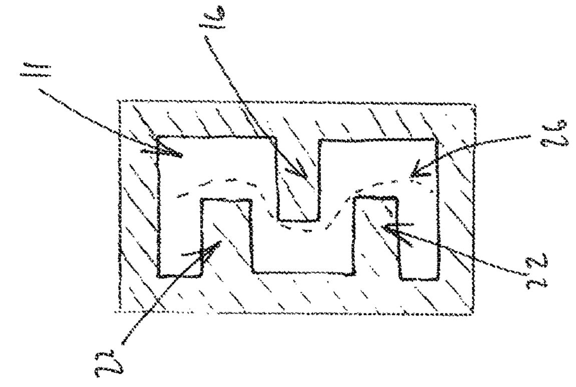
Figure 7B:
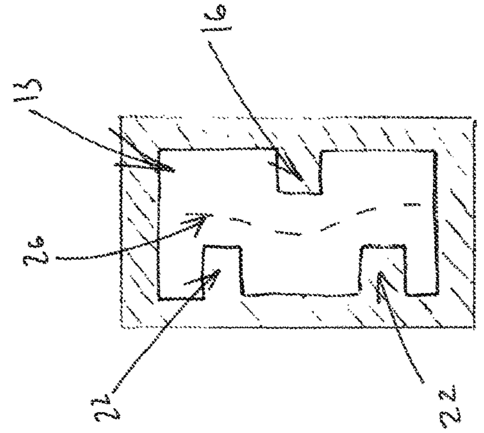
Figure 7A:
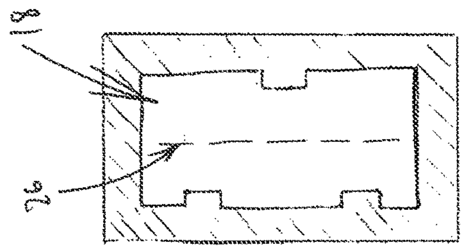
Figure 8:
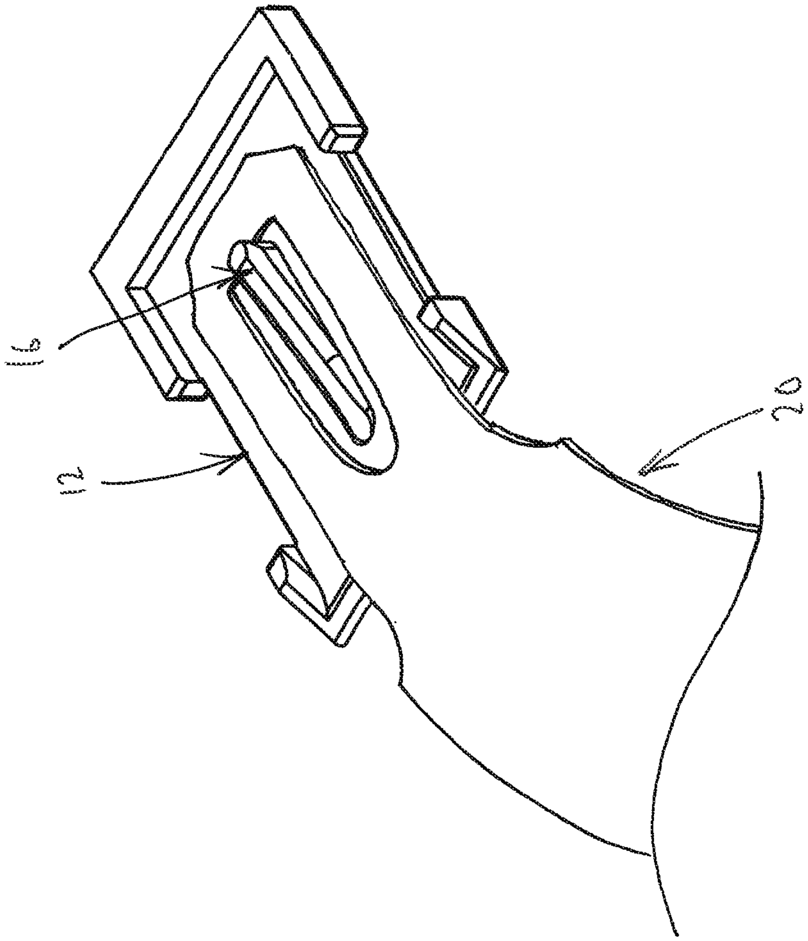
FIG. 8 is a hand drawing of a perspective view of the label in the receiving condition, corresponding to FIG. 7*d;*

The receiving member 16 and retaining member 22 are spaced from each other and extend inwardly from the base 12 and the cover 26, respectively so as to define a, typically substantially tortuous, pathway in an overlapping region 11 between the receiving 16 and retaining members 22, typically peripheral regions 16*a*, 22*a* of the members overlap, wherein the members 16, 22 allow the label 20 to pass through the overlapping region 11 and into a receiving condition as shown in FIGS. 2*a* and 8 wherein the receiving member 16 receives the label 20 complementally thereon, and the retaining member 22 serves to inhibit the passing of the label 20 out of the overlapping region 11 in the receiving condition. As depicted in FIGS. 7*a* to 7*d* most clearly, the receiving and retaining members 16 and 22 taper away from the overlapping region 11, clearly shown in FIG. 7*c*, towards a label receiving inlet 13.

A unique identifier (not shown) is provided to identify and track each crate or container (not shown) on which the base 12 or cover 26 is mounted. The identifier is in the form of any suitable conventional identifier.

In use, the cover 12 is connected to the base 12 via engaging formations 28*a*, 28*b* defined by a peripheral region of the base 12 and cover 26, respectively, to define an enclosed receiving zone 18. The label 20 is inserted into the receiving zone 18 and guided by the receiving member 16 and retaining member 22 towards and into the overlapping region 11, between the receiving 16 and retaining members 22, into a receiving condition, wherein the receiving member 16 receives the label 20 complementally thereon, shown in FIG. 8, and the retaining member 22 serves to inhibit the passing of the label 20 out of the overlapping region 11 in the receiving condition.

In use and referring specifically to FIGS. 7*a* to 7*d* and 8, a top portion 26 of the label 20 is inserted into the label receiving device 10 and is received by the receiving zone 18 as shown in FIG. 7*a*. As the top portion 26 of the label 20 is further inserted into the label receiving device 10, the label 20 starts to bend as it is received by the label receiving inlet 13, which is narrower than the receiving zone 18 due to the receiving member 16 and retaining member 22 extending further inwardly from the base 12 and the cover 26, respectively as shown in FIG. 7*b*. The receiving member 16 and retaining member 22 extend yet further inwardly along their lengths from the base 12 and the cover 26, respectively, so as to define a tortuous pathway in the overlapping region 11 between the receiving 16 and retaining members 22 through which the top portion 26 passes as shown in FIG. 7*c*. The members 16 and 22 allow the top portion 26 of label 20 to pass through the overlapping region 11 and into a receiving condition, most clearly shown in FIGS. 2*a*, 7*d* and 8, wherein the receiving member 16 receives the label 20 complementally thereon, and the retaining member 22 serves to inhibit the passage of the label 20 out of the overlapping region 11 in the receiving condition.

Figure 3B:
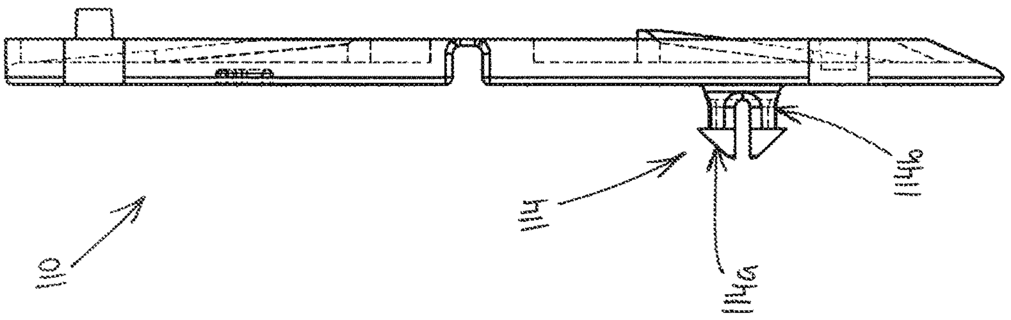
FIG. 3*b* is a side view of the label retaining device shown in FIG. 3*a;*
Figure 3A:
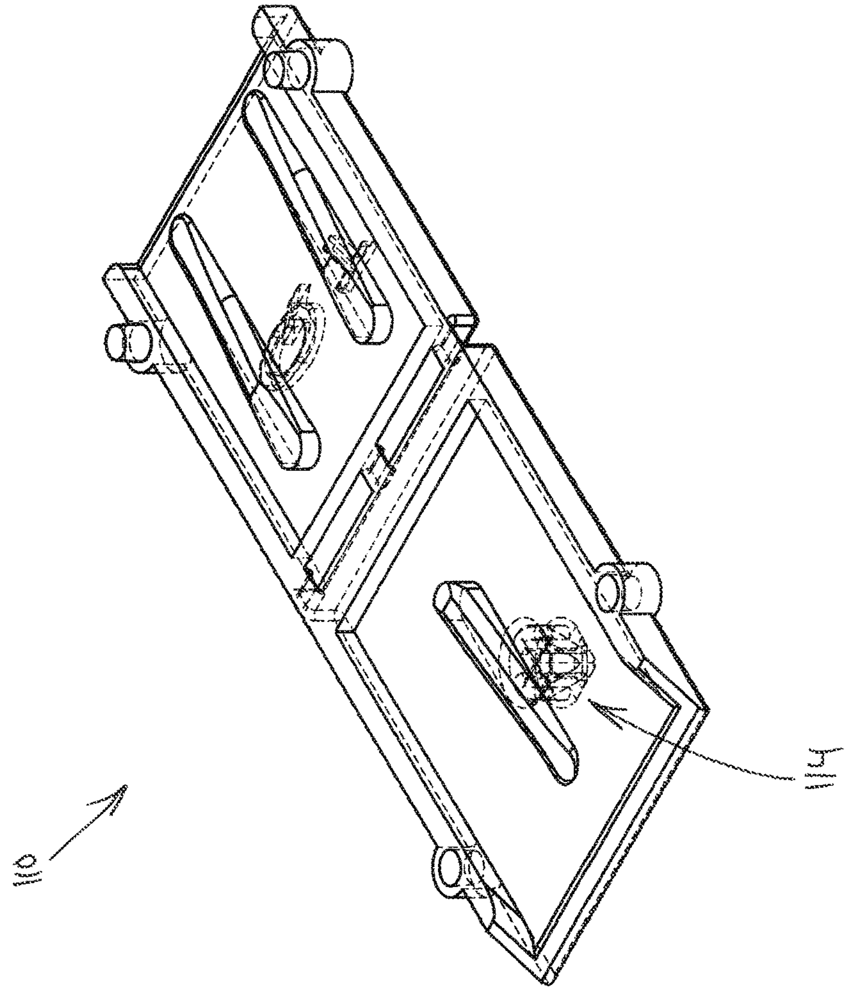
FIG. 3*a* is a perspective view of a second embodiment of the label retaining device.

Referring now to FIGS. 3*a* and 3*b*, reference numeral 110 refers generally to a label retaining device in accordance with a second embodiment of the invention. In this embodiment, the mounting arrangement 114 further includes an anchoring portion 114*a* which is shaped and configured to anchor the extension portion 114*b* within the apertures of an article (not shown) to be labelled.

Figure 4C:
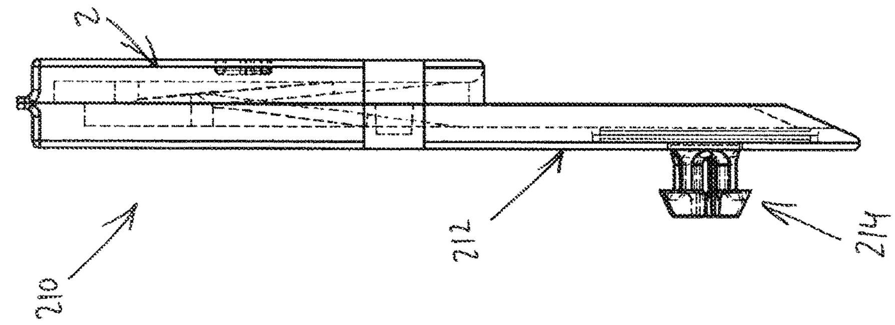
FIG. 4*c* is a side view of the label retaining device shown in FIG. 4*a;*
Figure 4B:
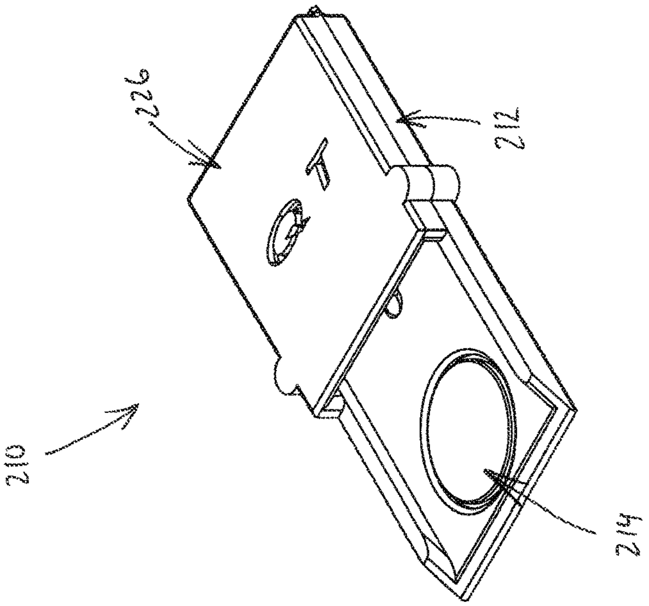
FIG. 4*b* is a perspective view of the label retaining device shown in FIG. 4*a*
Figure 4A:
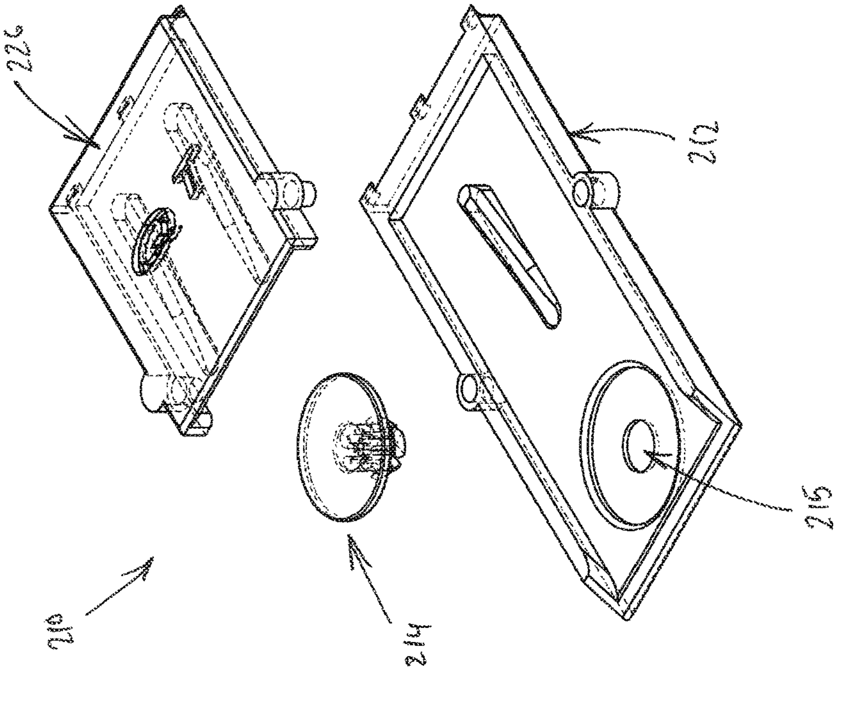
FIG. 4*a* is an exploded view of a third embodiment of the label retaining device.

Referring now to FIGS. 4*a* to 4*c*, reference numeral 210 refers generally to a label retaining device in accordance with a third embodiment of the invention. In this embodiment, the base 212 defines an aperture 215 which is sized and shaped to receive any suitable conventional mounting arrangement 214 therethrough to mount the base 212 on the article (not shown). The mounting arrangement 214 is in the form of any suitable conventional rivet, push-clip, screw or the like, typically being in form of a push-clip type member as shown in the Figures.

Figure 5B:
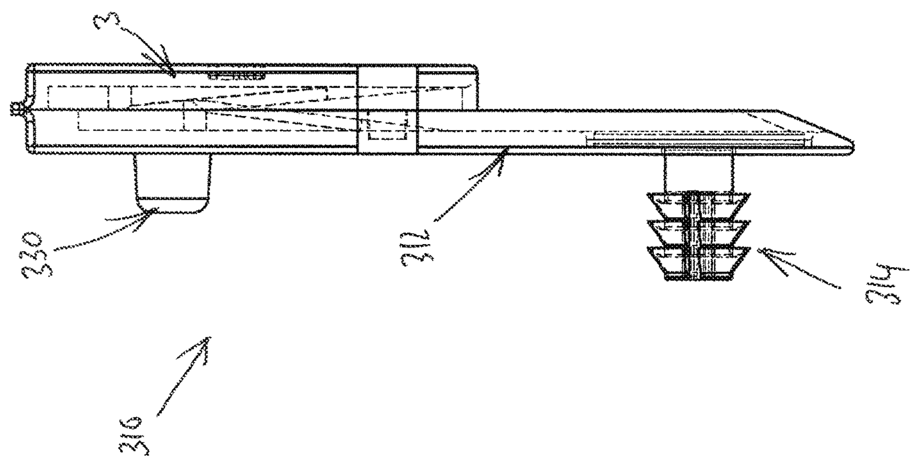
FIG. 5*b* is a side view of the label retaining device shown in FIG. 5*a;*
Figure 5C:
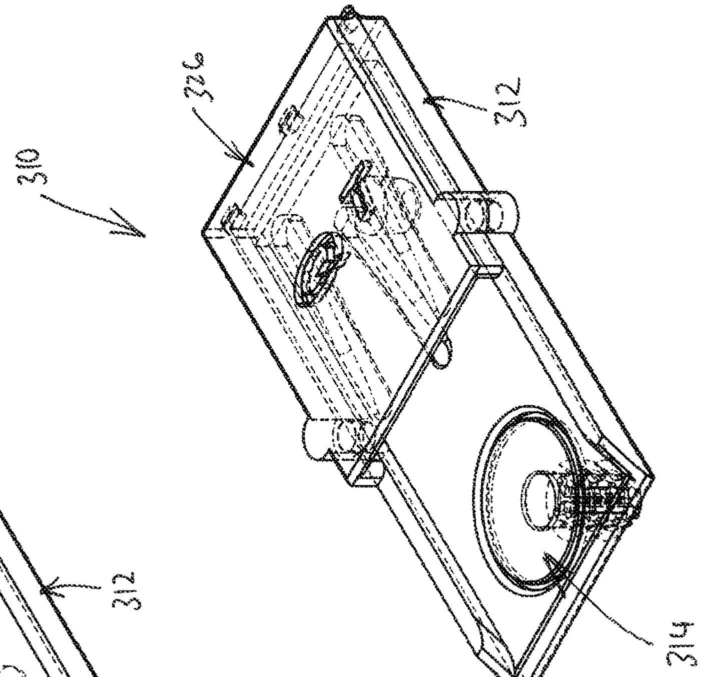
FIG. 5*c* is a perspective view of the label retaining device shown in FIG. 5*a*
Figure 5A:
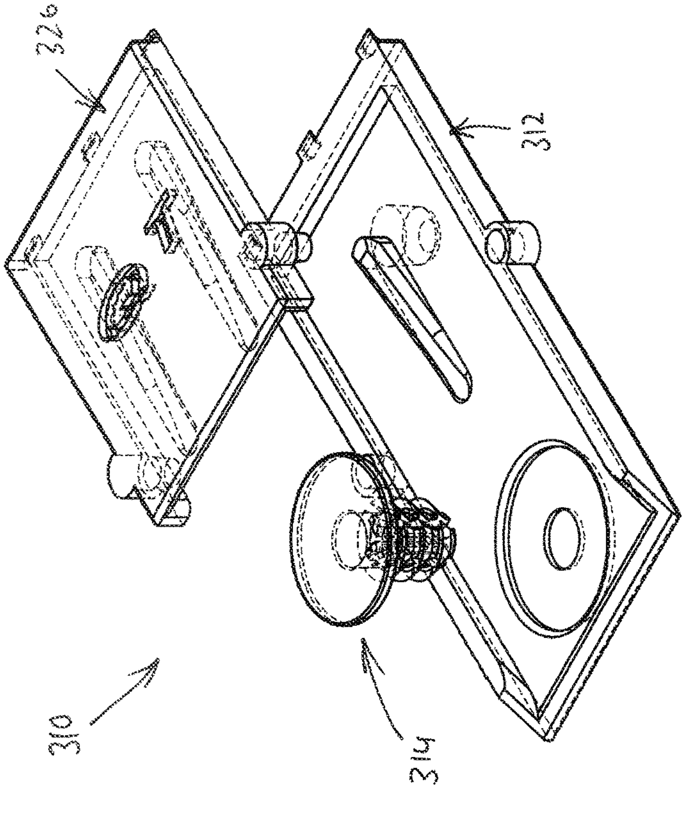
FIG. 5*a* is an exploded view of a fourth embodiment of the label retaining device.

Referring now to FIGS. 5*a* to 5*c*, reference numeral 310 refers generally to a label retaining device in accordance with a fourth embodiment of the invention. In this embodiment, a locating member 330 is further provided which extends outwards the base 312 for locating the base 312 on the article (not shown) and to inhibit pivoting of the base 312 about the mounting arrangement 314 relative the article. The locating member is in the form of a protrusion 330 which is shaped to fit within an aperture (not shown) defined by the article (not shown).

Figure 6B:
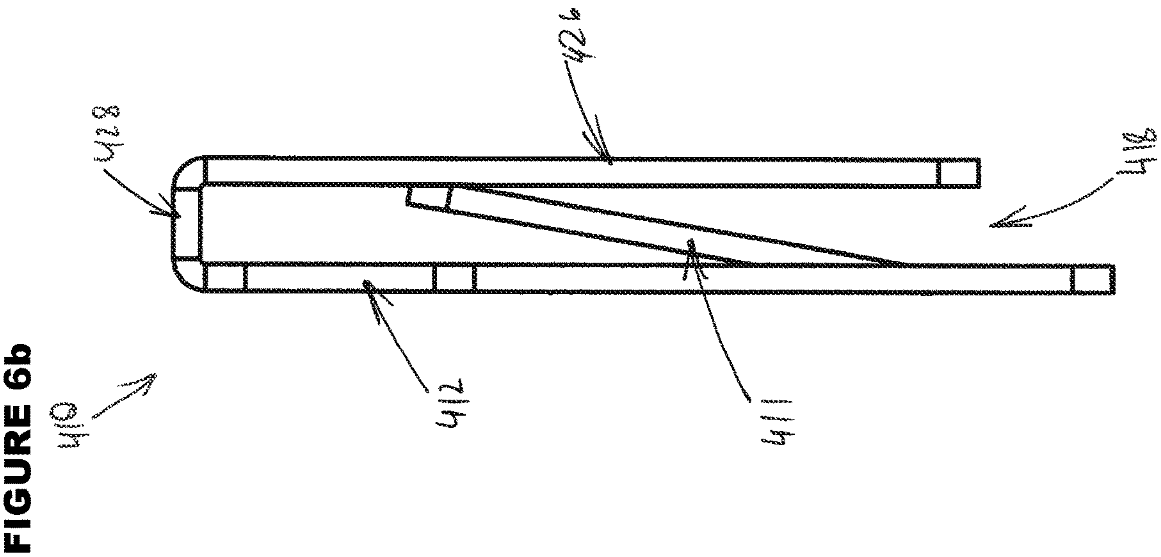
FIG. 6*b* is a side view of the label retaining device shown in FIG. 6*a;*
Figure 6A:
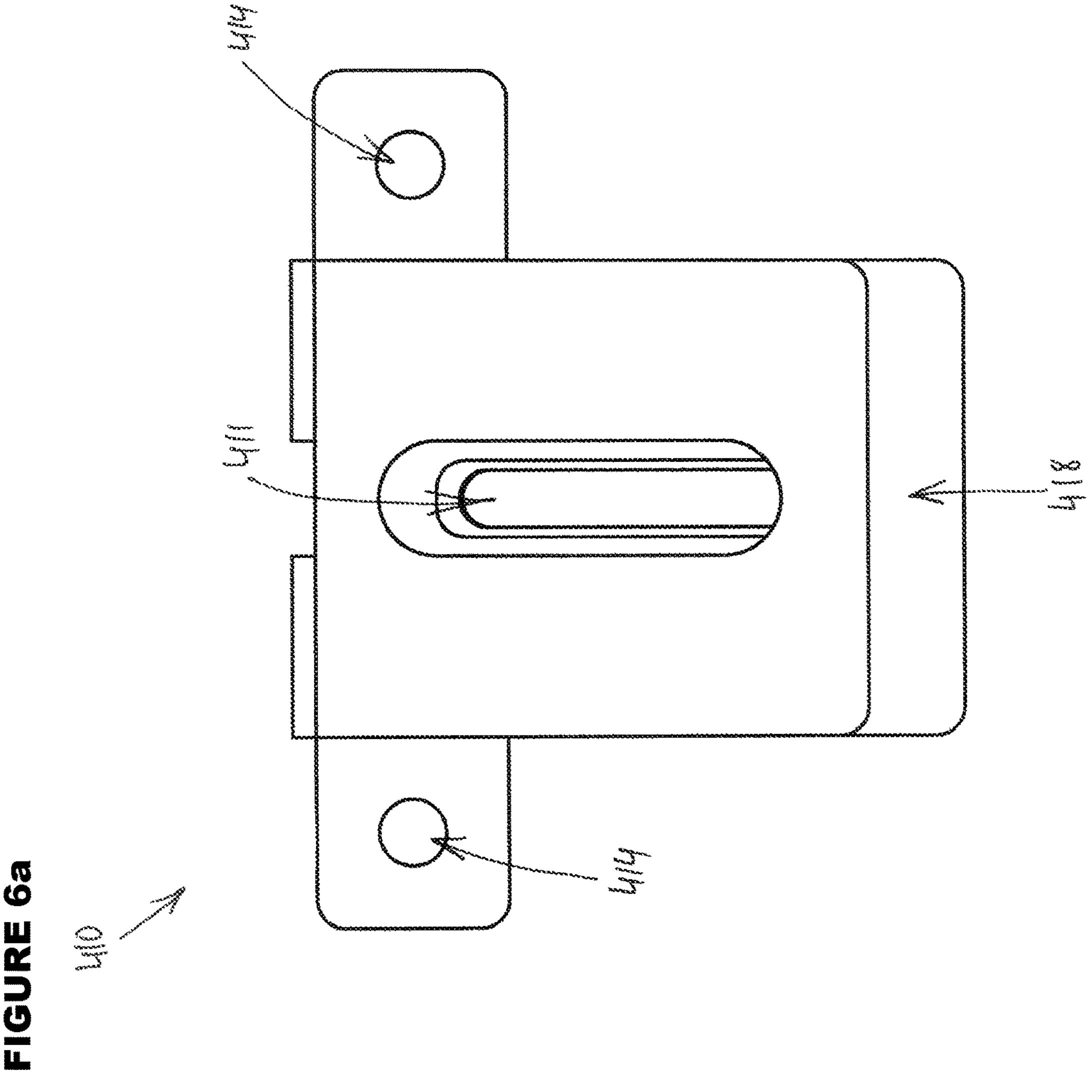
FIG. 6*a* is a front view of a fifth embodiment of the label retaining device.

Referring now to FIGS. 6*a* and 6*b*, reference numeral 410 refers generally to a label retaining device in accordance with a fifth embodiment of the invention. In this embodiment, a connector 428 is provided to allow removable hinged interconnection with the cover 426. The receiving and retaining members are in the form of a formation 411 which extends inwardly from the base 412 towards an opposing surface of the cover 426, a free end region of the formation 411 being sized, shaped and/or configured so as to define a passage (not shown) which permits passing of the label 20 therethrough and into a receiving condition (not shown), wherein the member 411 receives the label 20 complementally thereon via an aperture 23 defined in the label 20 (shown in FIGS. 2*b* and 2*c*) for such purpose and inhibits passing of the label 20 out of the passage (not shown) in the receiving condition (not shown). It is to be appreciated that the formation 411 can extend inwardly from the cover 426 towards an opposing surface (not shown) of the base 412.

Figure 9B:
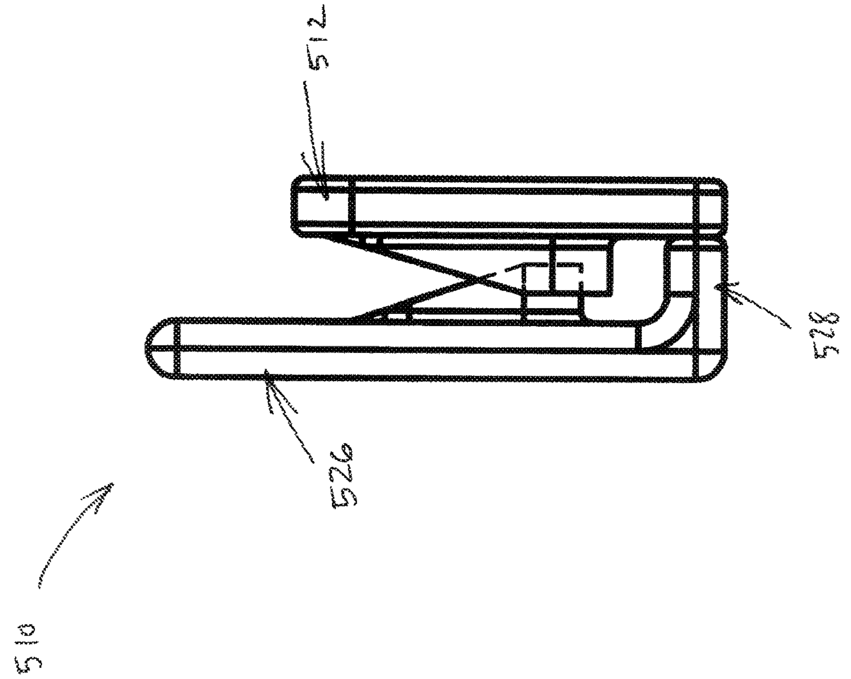
FIG. 9*b* is a side view of the label retaining device shown in FIG. 9*a;*
Figure 9A:
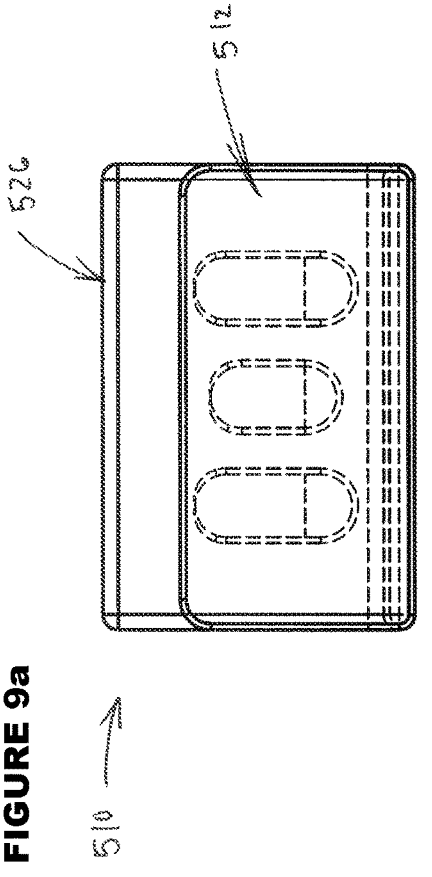
FIG. 9*a* is a front view of a sixth embodiment of the label retaining device.
Figure 9C:
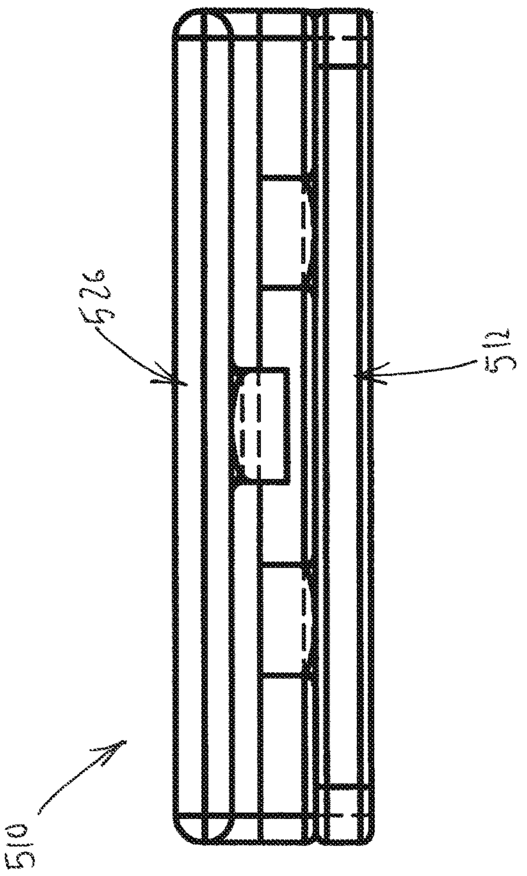
FIG. 9*c* is a top view of the label retaining device shown in FIG. 9*a;*

Referring now to FIGS. 9*a* to 9*c*, reference numeral 510 refers generally to a label retaining device in accordance with a second embodiment of the invention. In this embodiment, the cover 526 is formed integrally the base 512.

Figure 11B:
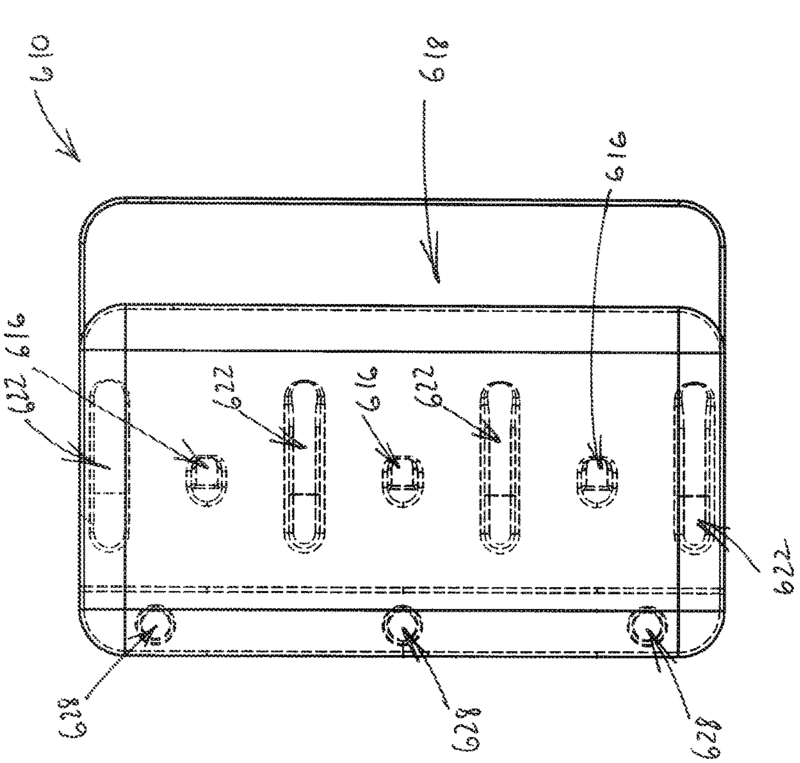
FIG. 11*b* is a front view of the label retaining device shown in FIG. 11*a;*
Figure 11C:
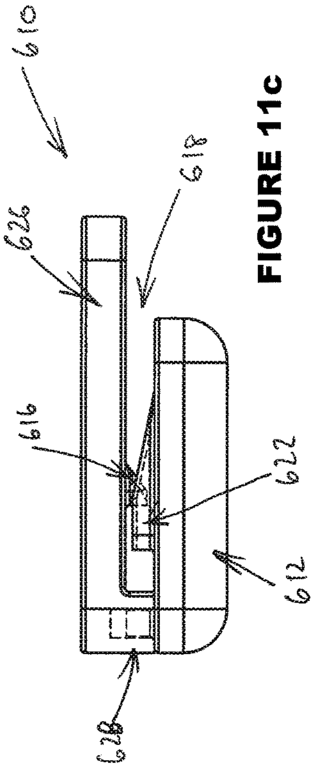
FIG. 11*c* is a top view of the label retaining device shown in FIG. 11*a;*
Figure 11A:
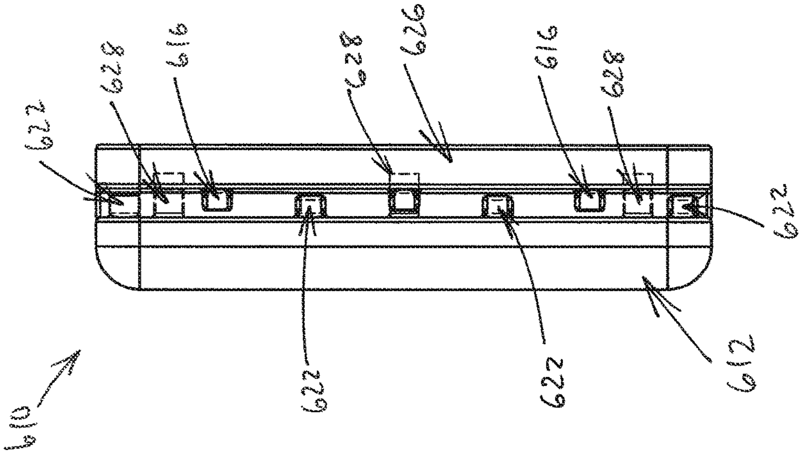
FIG. 11*a* is a side view of a seventh embodiment of the label retaining device.

Referring now to FIGS. 11*a* to 11*c*, reference numeral 610 refers generally to a label retaining device in accordance with a second embodiment of the invention. In this embodiment, a connector 628 is provided to allow removable interconnection, of the base 612, with the cover 626. A plurality of receiving members 616 are arranged on the base 612 which define a plurality of receiving zones 618 for receiving a label complementally thereon via a plurality of apertures 223 defined in the label 220 for such purpose and a plurality of retaining members 622 for facilitating retention of the label 220 in the receiving zones 618.

Figure 12A:
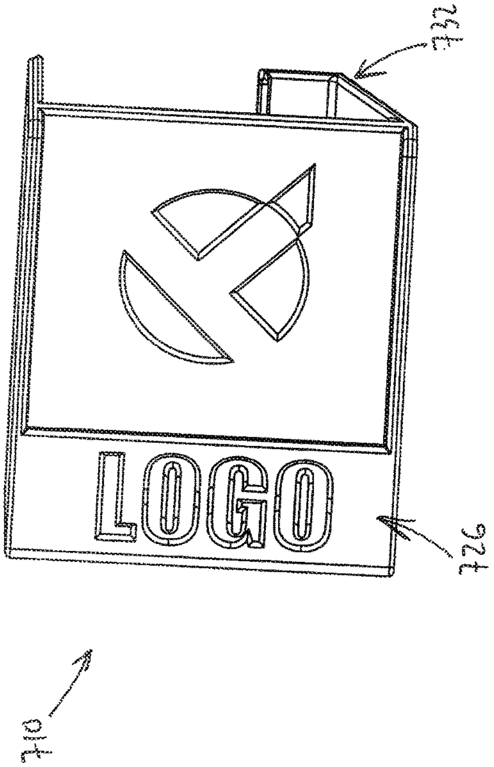
FIG. 12*a* is a perspective view of an eighth embodiment of the label retaining device.
Figure 12B:
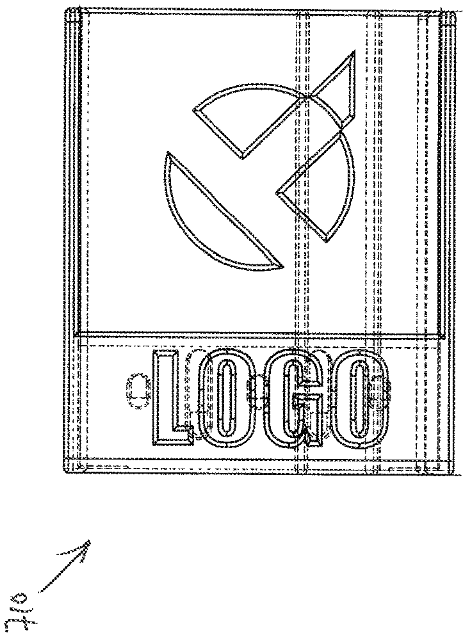
FIG. 12*b* is a front view of the label retaining device shown in FIG. 12*a;*
Figure 12C:
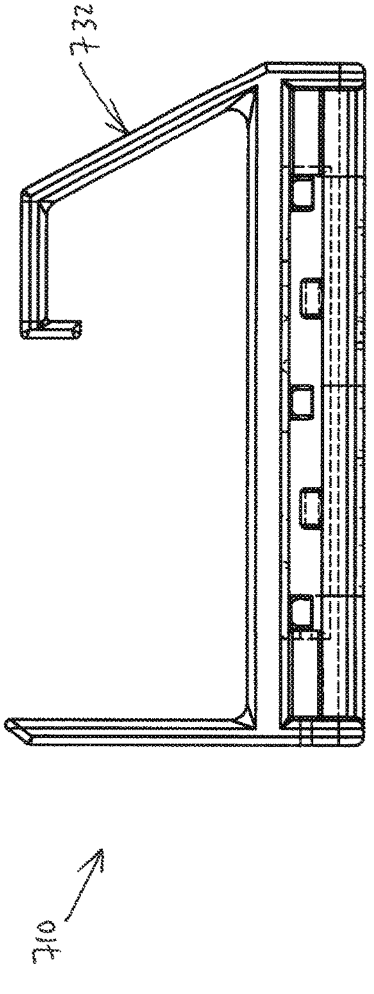
FIG. 12*c* is a side view of the label retaining device shown in FIG. 12*a;*

Referring now to FIGS. 12*a* to 12*c*, reference numeral 710 refers generally to a label retaining device in accordance with a second embodiment of the invention. In this embodiment, the cover 726 is formed integrally the base 712. A support member 732 is provided which extends from the base 712 to allow the base to be supported on a surface (not shown). The support member 732 is be formed integrally the base 712.

The label retaining device 10, 110, 210, 310, 410, 510, 610, 710 as hereinbefore described is manufactured from any suitable synthetic, plastic or metallic material.

Referring once again to FIGS. 2*a* to 2*c*, a label 20 is provided which includes a body 21, a neck portion 22 defined by the body 21 which is shaped to be received complementally by a label retaining device 10, 110, 210, 310, 410 as hereinbefore described, an aperture 23 defined in the neck portion 22, and a frangible portion 24 arranged between a peripheral region 22*a* of the neck portion and the aperture 23 to facilitate frangible removal of the label 10 from the label retaining device 10, 110, 210, 310, 410.

A unique identifying means (not shown) is provided on a lower portion 25 of the body 21 to identify and provide information about an article (not shown) associated therewith. The unique identifying means is in the form of any suitable conventional barcode, QR code, microdot or the like.

Figure 10B:
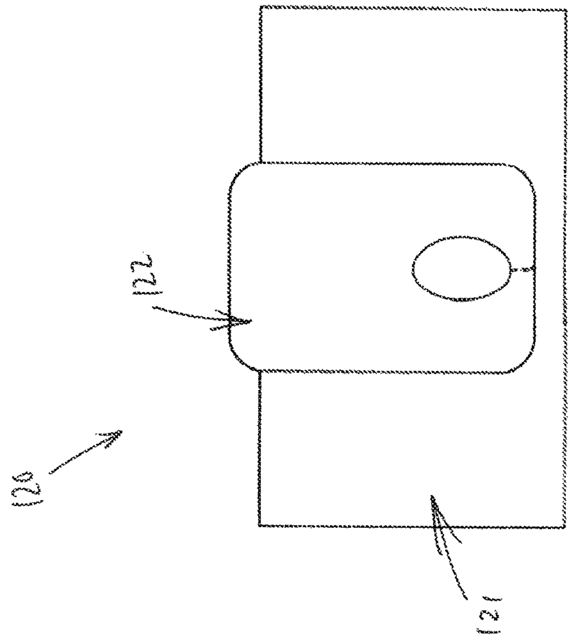
FIG. 10*b* is a rear view of the label shown in FIG. 10*a;*
Figure 10A:
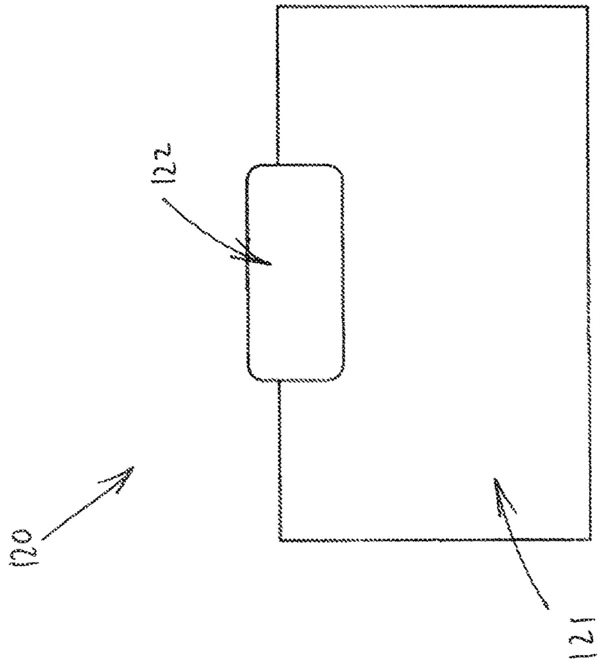
FIG. 10*a* is a front view of a second embodiment of the label.

Referring now to FIGS. 10*a* and 10*b*, reference numeral 120 refers generally to a second embodiment of the label in accordance with the invention. In this embodiment, the neck portion 122 is shaped to be received complementally by a label retaining device 510 as hereinbefore described. A mounting means, in the form of glue (not shown), is provided for mounting the neck portion 122 on the body 121.

Figure 13B:
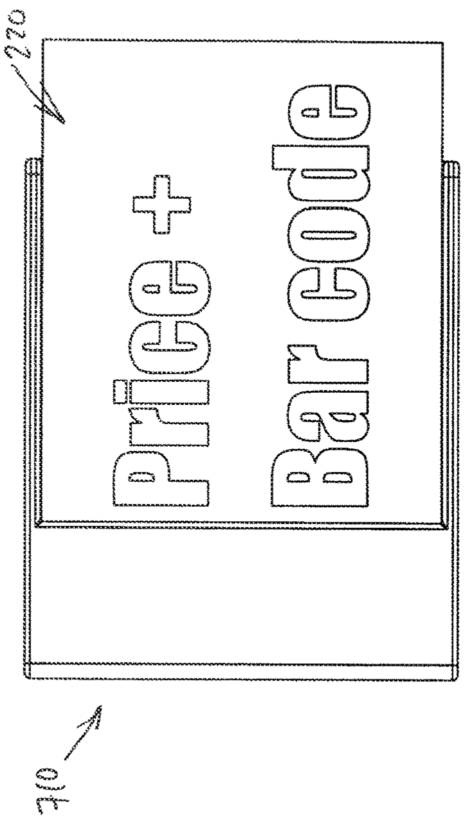
FIG. 13*b* is a front view of the label retaining device shown in FIG. 12*a* retaining the label shown in FIG. 13*a;*
Figure 13A:
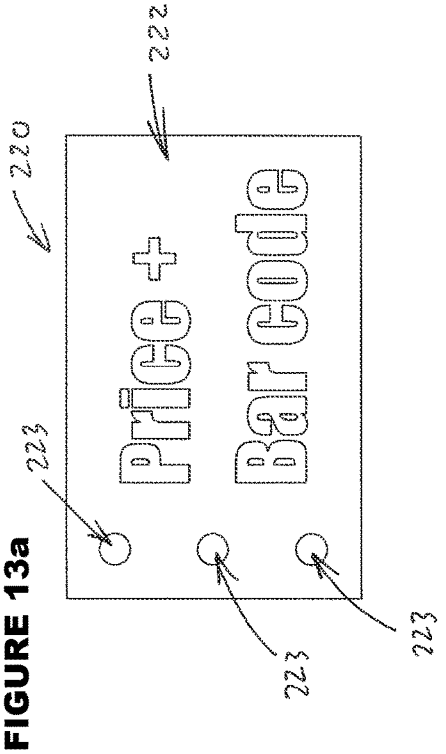
FIG. 13*a* is a front view of a third embodiment of the label.
Figure 13C:
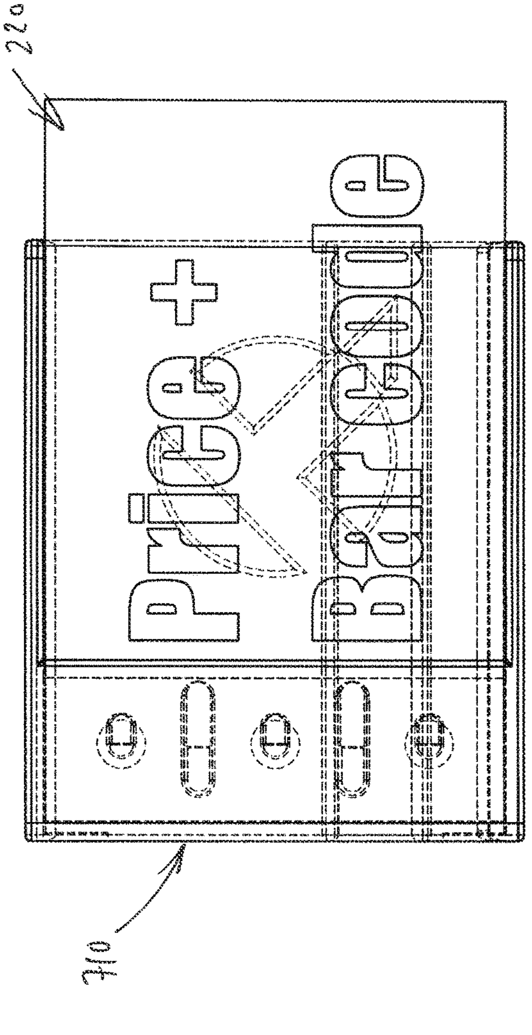
FIG. 13*c* is a front view of the label retaining device shown in FIG. 12*a* retaining the label shown in FIG. 13*a*, with hidden lines being shown.
Figure 14A:
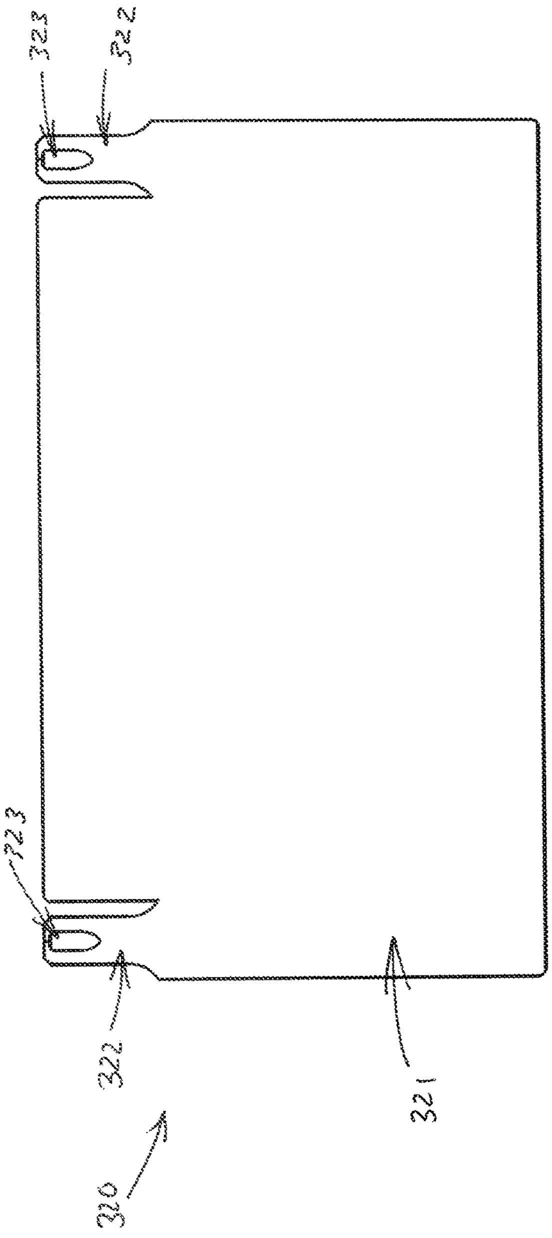
FIG. 14*a* is a front view of a fourth embodiment of the label.
Figure 14B:
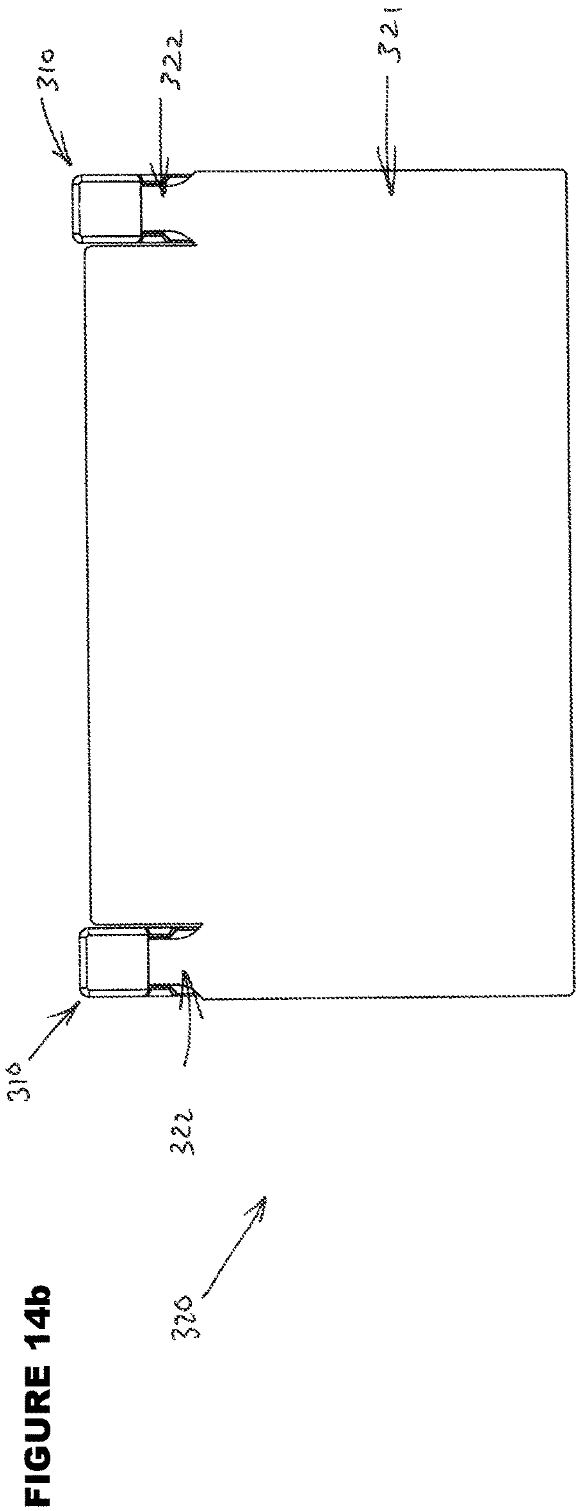
FIG. 14*b* is a front view of the label as shown in FIG. 14*a* where the label is received by a pair of label retaining devices in accordance with the present invention.

Referring now to FIGS. 13 and 14, reference numeral 220 refers generally to a third embodiment of the label in accordance with the invention. In this embodiment, the neck portion 222 defines a plurality of apertures 223. The neck portion 222 is shaped to be received complementally by a label retaining device 610, 710 as hereinbefore described.

Figure 15:
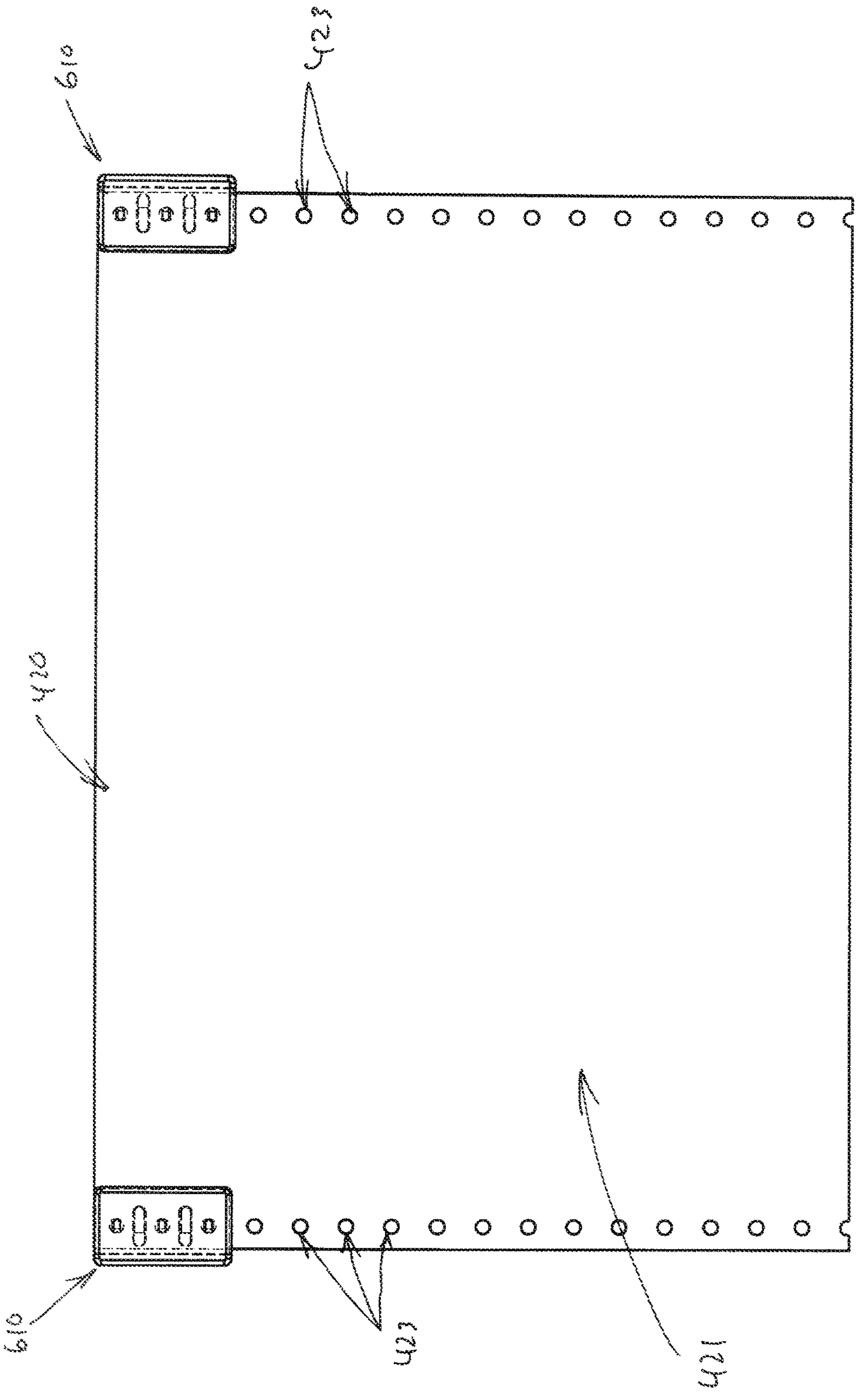
FIG. 15 is a front view of a fifth embodiment of the label where the label is received by label retaining devices in accordance with the present invention.

Referring now to FIGS. 15 and 16, reference numeral 320 refers generally to a fourth embodiment of the label in accordance with the invention. In this embodiment, a plurality of neck portions 322 are provided so that, in use, the label 320 is secured to a container, such as a trolley (not shown), using more than one label retaining device 10, 110, 210, 310, 410 as hereinbefore described. The body 321 is in the form of any one or more of the group including a pamphlet, leaflet, brochure, and advertising page. The neck portions 322 are arranged in a spaced apart manner relative the body 321 for allowing a mass or weight of the body 321 to be evenly supported by corresponding label retaining devices 10, 110, 210, 310, 410 in which the neck portions 322 are received. Typically, the neck portions 322 are arranged towards opposing side regions of the body 321. It is to be appreciated that further neck portions 322 are arranged along an edge of the bodies 321 which are larger and require additional support.

Referring now to FIG. 17, reference numeral 420 refers generally to a fifth embodiment of the label in accordance with the invention. In this embodiment, the neck portions 422 define a plurality of apertures 423. The neck portions 422 are shaped to be received complementally by label retaining devices 610 as hereinbefore described.

According to a third aspect of the invention, there is provided a label retaining assembly (not shown) which includes a label retaining device 10, 110, 210, 310, 410 as hereinbefore described and a container, in the form of any suitable conventional container and/or crate (not shown), wherein the label retaining device forms part of the container (not shown).

It is, of course, to be appreciated that the label retaining device in accordance with the invention is not limited to the precise constructional and functional details as hereinbefore described with reference to the accompanying drawings and which may be varied as desired.

Although only certain embodiments of the invention have been described herein, it will be understood by any person skilled in the art that other modifications, variations, and possibilities of the invention are possible. Such modifications, variations and possibilities are therefore to be considered as falling within the spirit and scope of the invention and hence form part of the invention as herein described and/or exemplified. It is further to be understood that the examples are provided for illustrating the invention further and to assist a person skilled in the art with understanding the invention and is not meant to be construed as unduly limiting the reasonable scope of the invention.

The inventor believes that the label retaining device in accordance with the present invention is advantageous in that the invention inhibits removal of a label therefrom and damages the label if it is removed so that the label cannot be reused. Another advantage is that the label retaining device can easily be mounted on a crate or container to be labelled, allowing the mounting thereof to be automated by arrangement of a robotic production line. The label is also effortlessly inserted into the label retaining device allowing this process to easily be automated as well.

The invention claimed is:

1. A label retaining device including:

a base;

a mounting arrangement for mounting the base on an article to be labelled;

a receiving member arranged on the base which defines a receiving zone for receiving a label complementally thereon via an aperture defined in the label for such purpose;

a retaining member for facilitating retention of the label in the receiving zone; and a cover for covering a portion of the base so as to enclose the receiving zone and to further facilitate retention of the label in the receiving zone;

wherein the receiving member and the retaining member are spaced from each other and extend inwardly from the base and the cover, respectively, so as to define a pathway in an overlapping region between the receiving and retaining members wherein the receiving and retaining members allow the label to pass through the overlapping region and into a receiving condition wherein the receiving member receives the label complementally thereon, and the retaining member serves to inhibit the passing of the label out of the overlapping region in the receiving condition.

2. A label retaining device as claimed in claim 1, wherein the base is shaped to sit substantially flush with an outer surface of the article to be labelled so as to hinder removal of the base from the article.

3. A label retaining device as claimed claim 1, wherein a connector is provided for allowing releasable, interconnection between the cover and the base.

4. A label retaining device as claimed claim 1, wherein the mounting arrangement is in the form of any suitable conventional mounting arrangement which is selected from the group including a rivet, push-clip, screw, tie, cable tie, adhesive, magnet, and clip.

5. A label retaining device as claimed in claim 1, wherein the receiving member and retaining member taper away from the overlapping region towards a label receiving inlet.

6. A label retaining device as claimed in claim 1, wherein a plurality of receiving members are arranged on the base which define a plurality of receiving zones for receiving a label or labels complementally thereon via a plurality of apertures defined in the label or labels for such purpose.

7. A label retaining device as claimed in claim 6, wherein a plurality of retaining members are provided for facilitating retention of the label or labels in the plurality of receiving zones.

8. A label retaining device as claimed in claim 1, wherein a unique identifier is provided to identify and track each article on which the base is mounted.

* * * * *